(12) United States Patent
Williams et al.

(10) Patent No.: US 7,128,376 B2
(45) Date of Patent: Oct. 31, 2006

(54) REDUNDANT ARCHITECTURE FOR BRAKE-BY-WIRE SYSTEM

(75) Inventors: Aaron Charles Williams, Hinesburg, VT (US); Bryan Anthony Ash, Bristol, VT (US); Peter Stanton Conklin, South Burlington, VT (US); David Zwick, Pittsford, NY (US); David Townsend, Montreal (CA)

(73) Assignee: Goodrich Corporation, Charlotte, NC (US)

( * ) Notice: Subject to any disclaimer, the term of this patent is extended or adjusted under 35 U.S.C. 154(b) by 154 days.

(21) Appl. No.: 10/449,350

(22) Filed: May 30, 2003

(65) Prior Publication Data

US 2004/0239173 A1    Dec. 2, 2004

(51) Int. Cl.
*B60T 7/00* (2006.01)
*B60T 7/12* (2006.01)

(52) U.S. Cl. ............ 303/15; 303/DIG. 9; 701/76
(58) Field of Classification Search .......... 303/3, 303/15, 20, 9.61, 9.63, 122, 122.03, 122.04, 303/155, 157, 158, 191, 119.1, DIG. 9; 701/70.76, 701/78, 83; 244/111, 110 A
See application file for complete search history.

(56) References Cited

U.S. PATENT DOCUMENTS

| 3,847,445 | A |   | 11/1974 | Bissell et al. |
| 5,050,940 | A | * | 9/1991 | Bedford et al. ............ 303/166 |
| 5,353,685 | A | * | 10/1994 | Snow ............................ 91/459 |
| 5,968,106 | A | * | 10/1999 | DeVlieg et al. ............... 701/70 |
| 6,183,051 | B1 | * | 2/2001 | Hill et al. .................... 303/126 |
| 6,390,571 | B1 |   | 5/2002 | Murphy ....................... 303/126 |
| 6,513,885 | B1 | * | 2/2003 | Salamat et al. ........ 303/122.09 |

FOREIGN PATENT DOCUMENTS

| EP | 0 795 449 A2 |   | 9/1997 |
| WO | WO-0069721 A1 | * | 11/2000 |

\* cited by examiner

*Primary Examiner*—Melody M. Burch
(74) *Attorney, Agent, or Firm*—Renner, Otto, Boisselle & Sklar, LLP

(57) ABSTRACT

A redundant architecture for a brake-by-wire system is provided. The system includes a pressure source; at least one brake actuator for exerting a braking force on a wheel as a result of pressure provided by the pressure source; at least one servo valve for controlling an amount of pressure provided from the pressure source to the at least one brake actuator in response to a servo valve command signal; a shutoff valve in line with the at least one servo valve for preventing pressure from the pressure source from being provided to the at least one brake actuator in response to a shutoff valve command signal; a processor which executes code in order to carry out brake control operations, the processor outputting the servo command signal and the shutoff valve command signal in response to system inputs provided to the processor; a shutoff valve enable device for performing brake control operations redundant at least in part with the processor and based on the system inputs, and selectively enabling shutoff valve command signals from the processor to be provided to the shutoff valve based on the redundant brake control operations.

12 Claims, 5 Drawing Sheets

REDUNDANT ARCHITECTURE FOR BRAKE-BY-WIRE SYSTEM

TECHNICAL FIELD

The present invention relates generally to brake systems for vehicles, and more particularly to brake-by-wire systems suitable for use in aircraft.

BACKGROUND OF THE INVENTION

Various types of braking systems are known. For example, hydraulic, pneumatic and electromechanical braking systems have been developed for different applications.

An aircraft presents a unique set of operational and safety issues. For example, uncommanded braking due to failure can be catastrophic to an aircraft during takeoff. On the other hand, it is similarly necessary to have virtually fail-proof braking available when needed (e.g., during landing). Moreover, it is important that braking be effected promptly and reliably.

In view of shortcomings associated with conventional braking systems, there is a strong need in the art for a braking system which may be employed more reliably on a vehicle such as an aircraft.

SUMMARY OF THE INVENTION

A redundant architecture for a brake-by-wire system is provided. The system includes a pressure source; at least one brake actuator for exerting a braking force on a wheel as a result of pressure provided by the pressure source; at least one servo valve for controlling an amount of pressure provided from the pressure source to the at least one brake actuator in response to a servo valve command signal; a shutoff valve in line with the at least one servo valve for preventing pressure from the pressure source from being provided to the at least one brake actuator in response to a shutoff valve command signal; a processor which executes code in order to carry out brake control operations, the processor outputting the servo command signal and the shutoff valve command signal in response to system inputs provided to the processor; a shutoff valve enable device for performing brake control operations redundant at least in part with the processor and based on the system inputs, and selectively enabling shutoff valve command signals from the processor to be provided to the shutoff valve based on the redundant brake control operations.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
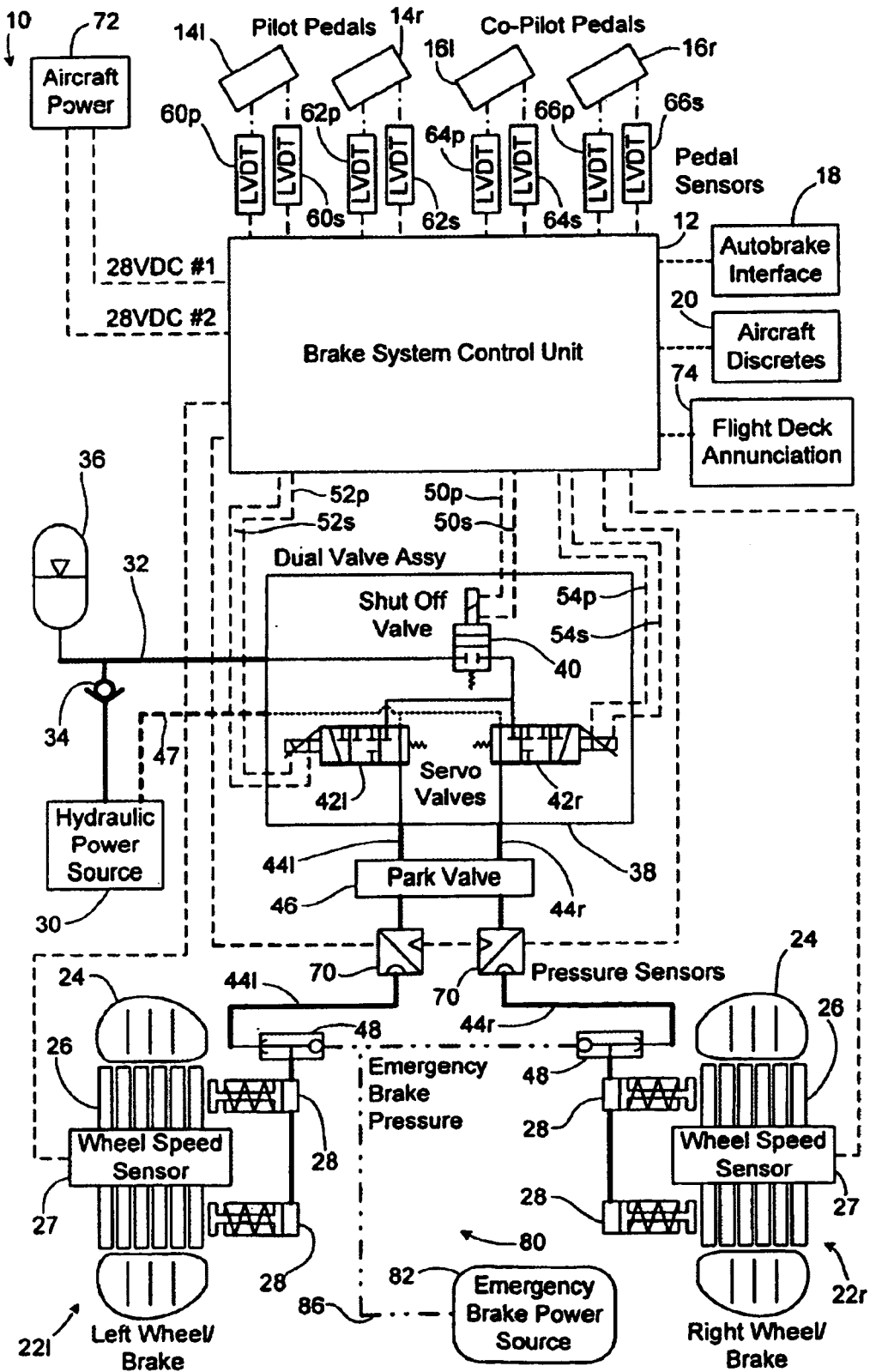
FIG. 1 is a block diagram of a redundant braking system architecture in accordance with an embodiment of the present invention.

The present invention will now be described with reference to the drawings, wherein like reference numerals are used to refer to like elements throughout.

Referring to FIG. 1, a redundant braking system 10 is shown in accordance with one embodiment of the present invention. The braking system 10 includes a braking system control unit (BSCU) 12 which is programmed to control the various braking functions described herein. In the exemplary embodiment, the braking system 10 provides braking for an aircraft. However, it will be appreciated that the braking system 10 may be used in connection with other types of vehicles without departing from the scope of the invention.

The BSCU 12 receives brake command signals from left and right pilot brake pedals 14*l* and 14*r*, respectively, and left and right co-pilot brake pedals 16*l* and 16*r*, respectively. The brake command signals from the pilot and co-pilot brake pedals are indicative of a desired amount of braking as is conventional. In addition, the BSCU 12 receives control signals from an autobrake interface 18 for performing conventional autobrake and rejected take-off (RTO) braking functions. The BSCU 12 also receives a series of discrete control signals associated with the aircraft, generally represented as 20, for providing conventional braking control.

In the exemplary embodiment, the BSCU 12 controls braking of a left wheel/brake assembly 22*l* and a right wheel/brake assembly 22*r*. The left wheel/brake assembly 22*l* includes a wheel 24 and brake stack 26. A plurality of actuators 28 are provided for exerting a brake force on the brake stack 26 in order to brake the wheel 24. The right wheel/brake assembly 22*r* has a similar configuration. Each wheel/brake assembly includes a wheel speed sensor 27 which provides wheel speed information to the BSCU 12 for carrying out brake control operations. It will be appreciated that while the present invention is described herein only with respect to two wheels, the principles of the present invention have application to any number of wheels.

A hydraulic power source 30 serves as the main brake power supply within the system 10. The main hydraulic line 32 from the power source 30 includes a check valve 34 and accumulator 36 as is conventional. The hydraulic line 32 is input into a dual valve assembly 38 included within the system 10. The dual valve assembly 38 includes a shutoff valve 40 through which the main hydraulic line 32 supplies hydraulic fluid to the left and right wheel servo valves 42*l* and 42*r*, respectively. Fluid from the left and right wheel servo valves 42*l* and 42*r* is provided through left and right hydraulic lines 44*l* and 44*r*, respectively, to a park valve 46 which holds the applied braking force to the wheels during a parking brake operation as is conventional. A return line 47 is provided from the servo valves 42*l* and 42*r* back to the hydraulic power source 30.

During normal operation, fluid pressure through the left and right hydraulic lines 44*l* and 44*r* passes through the park valve 46 and to the corresponding actuators 28 via a corresponding directional valve 48. Thus, provided the system is functioning properly, the shutoff valve 40 is open during braking and the BSCU 12 controls the amount of hydraulic pressure which is delivered to each wheel 24 via the corresponding servo valve **42*l* and 42*r***.

In accordance with the present invention, the shutoff valve 40 and the servo valves **42*l* and 42*r* are each dual control coil valves. As will be discussed in more detail below, the BSCU 12 includes a primary control channel and a secondary control channel. The shutoff valve 40 receives a shutoff valve control signal on line 50*p* from the primary channel and a shutoff valve control signal on line 50*s* from the secondary channel. Similarly, the left wheel servo valve 42*l* receives a servo valve control signal on line 52*p* from the primary channel and a servo valve control signal on line 52*s* from the secondary channel. Likewise, the right wheel servo valve 42*r* receives a servo valve control signal on line 54*p* from the primary channel and a servo valve control signal on line 54*s* from the secondary channel. Because the valves are each dual control coil valves, each valve can be controlled by both the primary and secondary channels of the BSCU 12**. Such redundancy, as is explained more fully below, allows full brake operation to continue even in the event one of the channels should fail.

Further redundancy is provided in the form of multiple transducers for providing the brake command signals from the pilot and co-pilot brake pedals to the BSCU 12. More particularly, the left pilot pedal **14*l* has a primary channel transducer 60*p* and a secondary channel transducer 60*s* associated therewith. Each transducer 60*p* and 60*s* provides a brake command signal to the BSCU 12 which is indicative of the degree of travel of the left pilot pedal 14*l*, and thus the amount of desired braking. Similarly, the remaining right pilot pedal 14*r* and co-pilot pedals 16*l* and 16*r* each have a corresponding pair of transducers respectively serving the primary and secondary channels in the BSCU 12. The right pilot pedal 14*r* includes transducers 62*p* and 62*s* serving the primary and secondary channels, respectively. The left co-pilot pedal 16*l* includes transducers 64*p* and 64*s* serving the primary and secondary channels, respectively. Finally, the right co-pilot pedal 16*r* includes transducers 66*p* and 66*s*** serving the primary and secondary channels, respectively. In the exemplary embodiment, the transducers for detecting the degree of movement of the pilot and co-pilot brake pedals are each a linear variable differential transformer (LVDT). However, it will be appreciated that a variety of other transducers could also be used without departing from the scope of the invention.

As is shown in FIG. 1, the braking system 10 includes pressure sensors 70 for monitoring the hydraulic pressure in lines **44*l* and 44*r* and providing such information back to the BSCU 12. In addition, power to the BSCU 12 preferably is provided via two separate and independent power buses designated 72. As is discussed more fully below in connection with FIG. 3, power to the primary and secondary channels is provided to the BSCU 12** via the respective power buses. Thus, the loss of power in relation to one channel does not disable the other channel, for example.

The braking system 10 further includes a cockpit display 74 coupled to the BSCU 12. The display 74 communicates to the pilot and co-pilot information relating to the braking operations as is conventional.

The braking system 10 also includes an emergency brake system 80 as an additional level of redundancy. The emergency brake system 80 is a completely independent braking source that can be used in the event of an otherwise total failure of the system 10. The emergency brake system 80 includes a separate power source 82 which provides power to the actuators 28 via line 86 and the directional valves 48.

The braking system 10 provides a high level of reliability and availability. This is achieved through the use of redundant components throughout most of the system. As noted above, the central component of the system is the BSCU 12, which contains two redundant brake control channels identified as the primary and secondary. These channels are each capable of performing full brake control independently and preferably are physically and electrically isolated from each other within the BSCU 12.

The hydraulic portion of the system 10 utilizes the shutoff valve 40 in line with the servo valves **42*l* and 42*r* to provide a level of redundancy that ensures a single valve failure cannot cause inadvertent braking. In order for braking force to be applied by the system 10, the shutoff valve 40 must be open along with at least one of the two servo valves 44*l* and 44*r*. To provide a redundancy so that the brakes can be operated when commanded, each of the valves (shutoff and servo) contain the dual control coils with one coil for each channel in the BSCU 12** as described above.

The BSCU 12 utilizes the outputs from the LVDT transducers **60*p*, 60*s*, 62*p*, 62*s*, 64*p*, 64*s*, 66*p* and 66*s* to measure the degree to which each brake pedal 14*l*, 14*r*, 16*l* and 16*r* is being depressed. As noted above, to ensure the integrity of the braking commands from the brake pedals, the system 10 utilizes multiple transducers under each of the brake pedals. Although two are shown for each pedal, any number of transducers may be used for additional redundancy as will be appreciated. In the exemplary embodiment, one LVDT transducer for a given brake pedal is monitored by the primary channel within the BSCU 12, and the other LVDT transducer is monitored by the secondary channel within the BSCU 12**.

Figure 2:
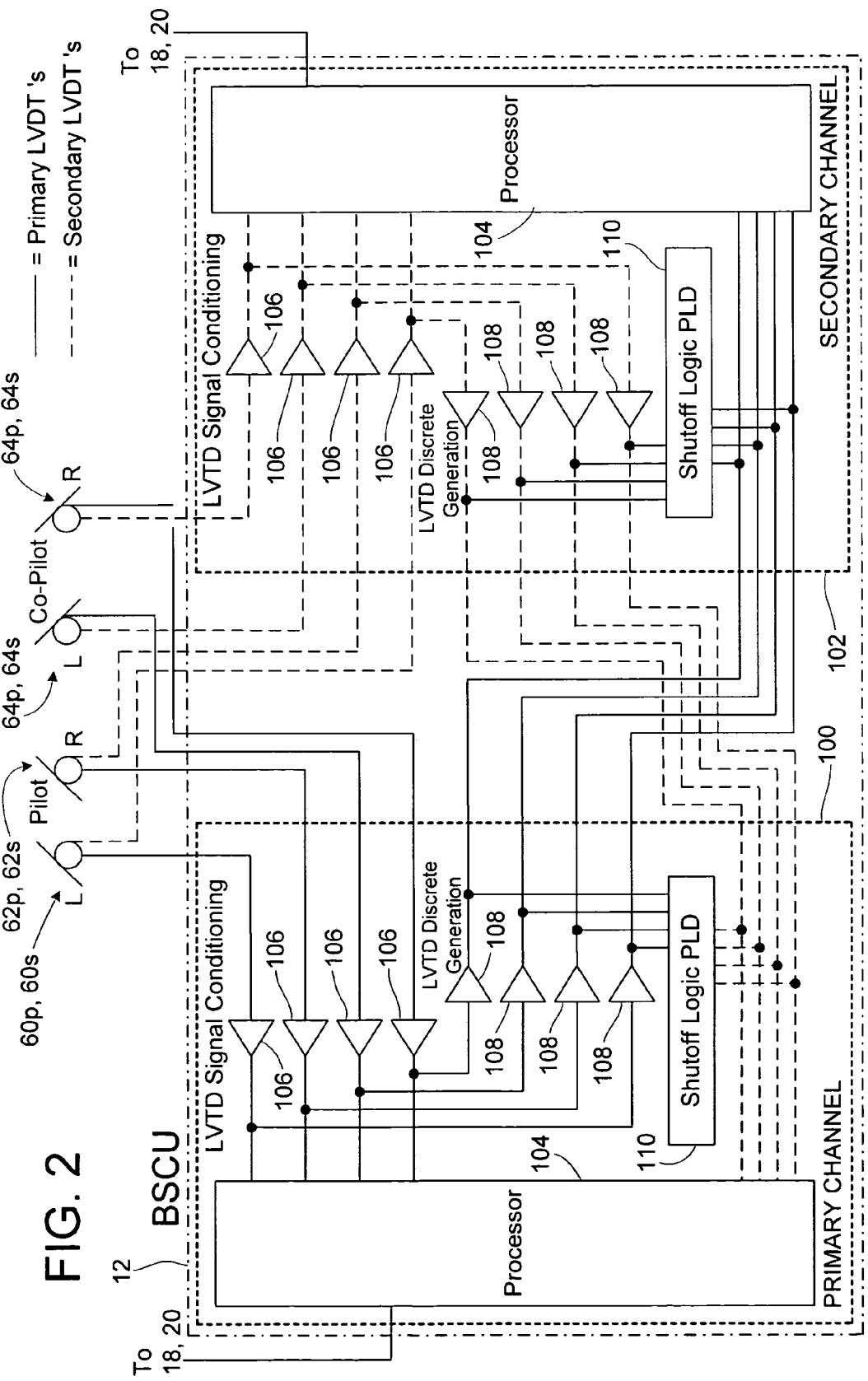
FIG. 2 is a schematic diagram of the pilot and co-pilot brake pedal transducer connection scheme in accordance with an embodiment of the present invention.

Referring now to FIG. 2, the connection scheme between the LVDT transducers within the BSCU 12 is illustrated. The primary and secondary channels within the BSCU 12 utilize internal discrete signals to communicate the status of their LVDT transducers to the other channel. Under normal conditions, both LVDT transducers within the dual LVDT transducers for a given brake pedal must be active in order for the BSCU 12 to command braking based on the pedal inputs.

In FIG. 2, the primary channel logic for the LVDT transducer connection scheme is represented at 100, and the secondary channel logic is represented at 102. The outputs from the primary channel transducers **60*p*, 62*p*, 64*p* and 66*p* are input to the control processor 104 of the primary channel 100 of the BSCU 12 via corresponding signal conditioners 106. The control processor 104** is programmed to carry out all brake operations based on such inputs.

The conditioned outputs from the primary channel transducers **60*p*, 62*p*, 64*p* and 66*p* are also converted into discrete signals (e.g., active vs. inactive) by corresponding comparators 108. More particularly, the LVDT transducers produce an analog signal which is conditioned into an analog voltage (e.g., between 0 volts and 5 volts dc) that varies linearly in voltage depending on the degree of movement of the corresponding brake pedal. For example, the output of the LVDT transducers may be 0 volts if not depressed and 5 volts when fully depressed. The comparators 108 are each configured to compare the output from a corresponding one of the LVDT transducers with a fixed reference voltage slightly greater than 0 volts. Thus, if the LVDT transducers are functioning properly and the corresponding brake pedals are depressed to any degree, the output of the corresponding comparators 108 will be an active logic "1." If the LVDT transducers are not functioning properly (with a zero volt output failure construction) or the corresponding brake pedals are not depressed to any degree, the output of the corresponding comparators 108 will be an inactive logic "0." In this manner, comparators 108 are configured such that the output will be an active logic "1" if the corresponding LVDT transducer is functioning properly, and an inactive logic "0" if the corresponding LVDT transducer has failed. The discrete signals indicating the status of each of the primary channel transducers 60***p*, 62*p*, 64*p* and 66*p* are input to a shutoff logic array device 110 included in the primary channel 100.

As is shown in FIG. 2, the secondary channel 102 is basically identical to the primary channel but receives as inputs the outputs from the secondary channel transducers 60*s*, 62*s*, 64*s* and 66*s*. The outputs from the secondary transducers are conditioned in the same way as the primary channel signals as described above. The transducer outputs are processed by the secondary channel processor 104, and also converted into discrete signals and input to the shutoff logic array device 110 of the secondary channel 102.

As further shown in FIG. 2, the discrete signals from the primary channel LVDT transducers are provided to the shutoff logic array device 110 and the processor 104 of the secondary channel. Similarly, the discrete signals from the secondary channel LVDT transducers are provided to the shutoff logic array device 110 and processor 104 of the primary channel. Under normal conditions, the shutoff logic array device 110 of one channel utilizes the LVDT transducer discrete signals from the other channel to determine when braking is commanded and the shutoff valve should be open. If the other channel has failed, the shutoff logic array device 110 automatically switches and uses the discrete signals from it's own channel. Such operation is described in more detail below with respect to FIG. 5.

Figure 3:
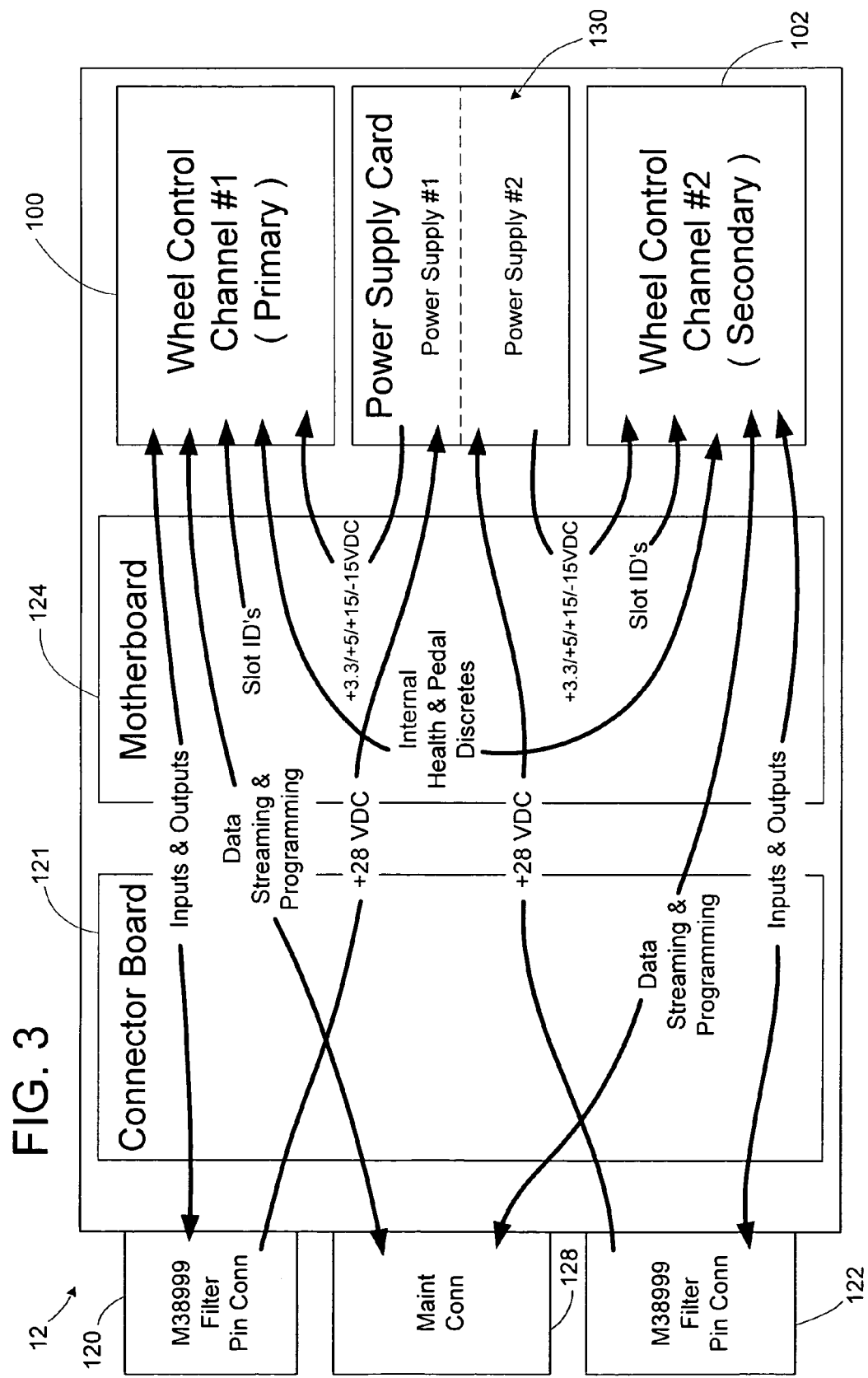
FIG. 3 is a block diagram of the brake system control unit (BSCU) in accordance with an embodiment of the present invention.

FIG. 3 illustrates the basic configuration of the BSCU 12. As is illustrated, the BSCU 12 includes a primary channel connector 120 on a connector board 121 which couples the primary channel signals and the first power bus to/from the BSCU 12. Likewise, the BSCU 12 includes a secondary channel connector 122 which couples the secondary channel signals and the second power bus to/from the BSCU 12. The primary channel 100 and the secondary channel 102 are formed on separate and independent circuit boards and are coupled to the motherboard 124. The primary channel 100 and secondary channel 102 are each capable of independently carrying out all typical braking functions (e.g., manual brake control, automatic brake control, antiskid braking, locked wheel protection, touchdown protection, park capability, gear retraction braking, system health monitoring, on aircraft programming, on aircraft tuning, on aircraft data streaming, wheelspeed sensor interface, metering valve drive capability, shutoff valve drive capability, utilities, etc.).

A maintenance connector 128 is included in the BSCU 12 and provides a means to carry out data steaming and programming for maintenance operations. Such operations are independent of the brake control described herein and therefore are not described in detail.

The power supply card 130 within the BSCU 12 includes a pair of isolated power supplies which receive power, respectively, from the first and second power buses. Each power supply is dedicated to a specific brake control channel in the BSCU 12. Preferably, for redundancy purposes the two power supplies are powered by the separate power buses. However, both power supplies could be powered by the same power bus, although redundancy for a failed power bus would be lost as will be appreciated.

During normal operation, only one of the channels is in charge of braking with the other channel remaining passive. Unless a failure is detected on the primary channel 100, the primary channel 100 is always in control of braking with the secondary channel 102 remaining passive until needed. The processors 104 for both channels are able to perform built-in testing on themselves to determine if they themselves have experienced a fatal failure. When a fatal failure occurs, the failed channel can notify the other channel of the problem via internal discrete signals that are controlled by either the processor 104 or a hardware reset. The other channel then takes over control, albeit at the loss of one level of redundancy. Furthermore, the processors 104 receive the LVDT transducer discrete signals from the other channels, as shown in FIG. 2. This permits the processors 104 to perform comparisons between the LVDT transducers of the respective channels to aid in such built-in testing.

Continuing to refer to FIG. 3, the primary channel 100 and secondary channel 102 preferably are physically isolated from each other in the BSCU 12 to the greatest extent possible. This includes the separate connectors 120 and 122 for each channel. Moreover, the two channels are further isolated from each other electrically by utilizing optocouplers for the health and brake pedal transducer discrete signals that are sent between the two channels.

Figure 4:
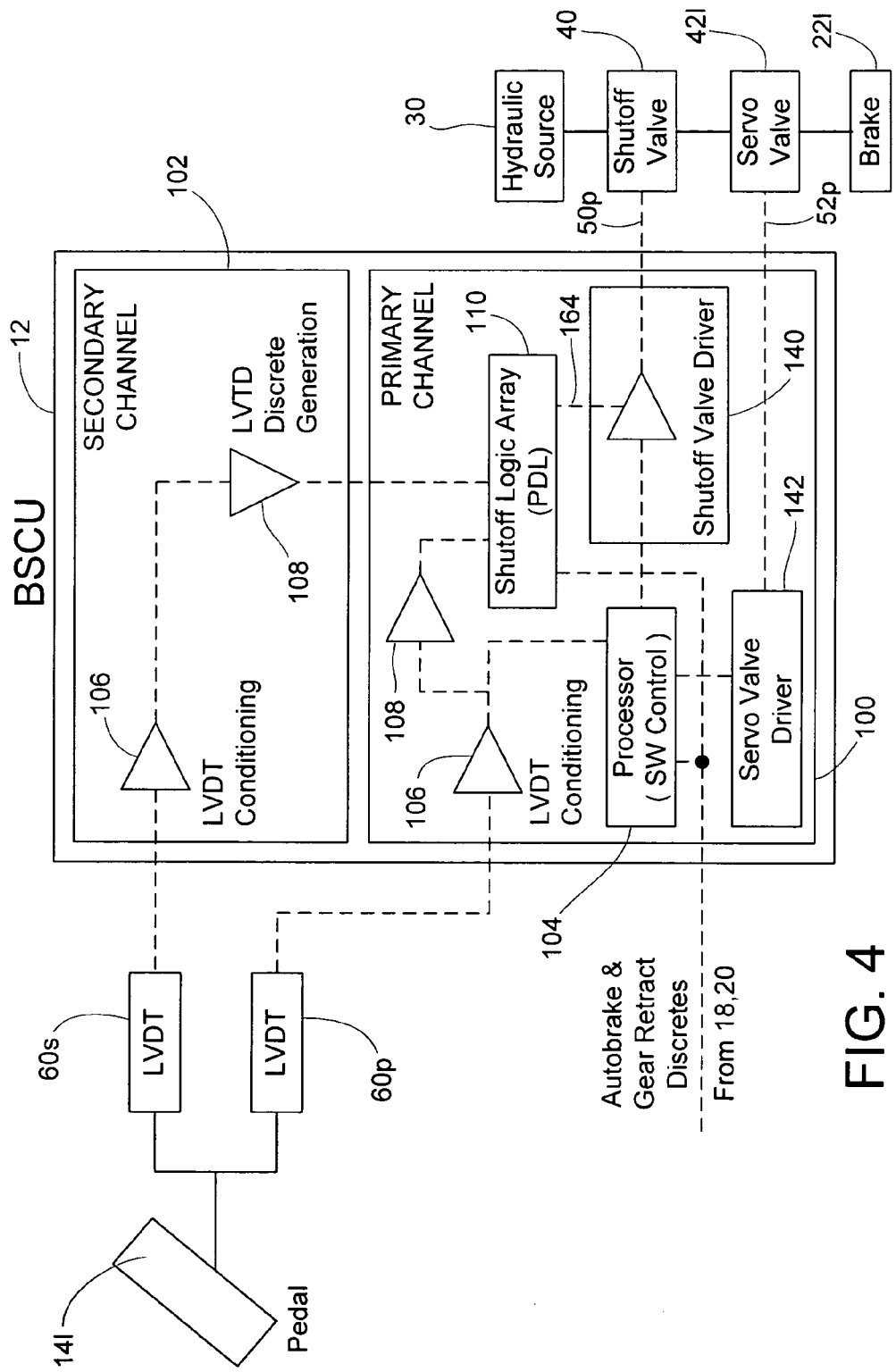
FIG. 4 is a simplified block diagram representing a brake control scheme in accordance with an embodiment of the present invention.

FIG. 4 illustrates the simplified brake control scheme carried out in the BCSU 12. To prevent the software within the BSCU from being a potential single point failure that could cause inadvertent braking, each channel in the BSCU 12 utilizes a redundant hardware and software control loop to control the shutoff valve 40 as represented in FIG. 4. The simplified scheme shown in FIG. 4 illustrates the scheme with respect to a single brake pedal (e.g., 14*l*) for a single brake, although it will be appreciated that the remaining pedal commands are processed in the same manner. Also, the secondary channel 102 is presumed passive and therefore is further simplified in FIG. 4.

The software control loop is driven by the BSCU 12 software (i.e., the software which is executed by the BSCU 12 in carrying out the operations described herein). Since one having ordinary skill in the art of computer programming could readily provide such software based on the description herein, further detail is omitted for sake of brevity. The BSCU 12 software controls the shutoff valve 40 to open when one of the following conditions exist, namely a brake pedal is enabled and touchdown protection is satisfied; a valid autobrake condition exists; or a valid gear retract condition exists. When one of these conditions exists, the processor 104 will send a command over the data bus to a shutoff valve driver 140 instructing the shutoff valve driver 140 to open the shutoff valve 40 to allow braking.

The circuitry for the shutoff valve driver 140 is configured such that both the software command from the processor 104 and the hardware control loop from the shutoff logic array device 110 must agree that the shutoff valve 40 should be open before braking is allowed. If the hardware and software control loops do not agree, the shutoff valve 40 remains closed in order to avoid inadvertent braking.

More particularly, each processor 104 is configured to perform the appropriate brake control functions based on the commands received from the brake pedals via the corresponding LVDT transducers, and the various discrete signals received from the autobrake interface 18 and the discrete control signals 20. Each processor 104 executes software based on such inputs to provide brake control functions in what may be a conventional manner. Based on such software control, the processor 104 sends commands to the shutoff valve driver 140 instructing the driver 140 to open the shutoff valve 40 when braking is desired. In addition, the processor 104 provides appropriate servo valve commands to the servo valve driver 142 which in turn opens and closes the servo valve 42 as appropriate.

Each shutoff logic array device 110, on the other hand, provides hardware control which serves to either enable or disable the corresponding shutoff valve diver 140. As is described in more detail below with respect to FIG. 5, the shutoff logic array device 110 generates an enable signal based on the various LVDT transducer discrete signals and other discrete signals from the autobrake interface 18 and discrete control signals 20. Provided the hardware control logic in the shutoff logic array device 110 determines a valid brake command exists, the shutoff logic array 110 enables the shutoff valve driver 140 such that the shutoff valve commands from the processor 104 effectively pass through to the shutoff valve 40. In the event the hardware control logic determines that a valid brake command does not exist, the shutoff logic array device 110 disables the shutoff valve driver 140. As a result, any shutoff valve commands from the processor 104 are effectively blocked from the shutoff valve 40. The shutoff valve 40 will therefore remain closed. In this manner, inadvertent braking is avoided by requiring that both the software control via the processor 104 and the hardware control via the shutoff logic array device 110 be in agreement.

Figure 5:
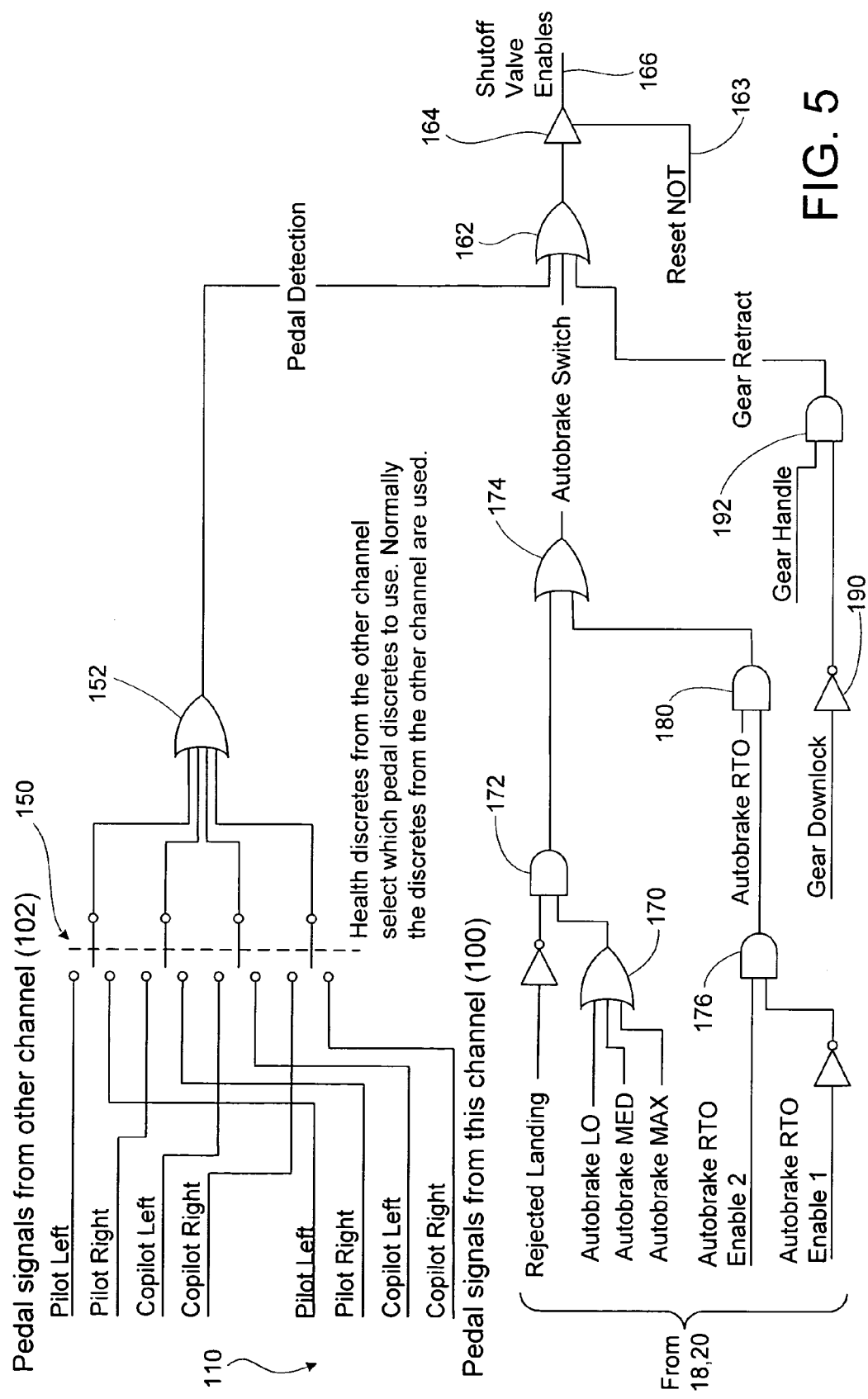
FIG. 5 is a schematic diagram of the shutoff logic for enabling the shutoff valve within the braking system architecture in accordance with an embodiment of the present invention.

FIG. 5 illustrates the hardware control loop carried out by the shutoff logic array device 110 in each channel. FIG. 5 illustrates the control loop for the primary channel 100 shutoff logic array device 110, although it will be appreciated that the shuttoff logic array device 110 for the secondary channel 102 is identical.

As is shown in FIG. 5, the shutoff logic array device 110 receives the LVDT transducer discrete signals (i.e., pilot left/right, co-pilot left/right) from the primary channel 100 and the LVDT transducer discrete signals (i.e., pilot left/right, co-pilot left/right) from the secondary channel 102. A switch array 150 is included which controls whether the LVDT transducer discrete signals from the primary channel 100 or the secondary channel 102 serve as the inputs to a four-input OR gate 152. The switch array 150 is controlled by logic (not shown) configured such that if the other channel fails (in this case the secondary channel 102) as determined by discrete signals exchanged between the respective channels which are indicative of the corresponding health of the channel, the LVDT transducer discrete signals from the present channel (in this case the primary) are used to control the shutoff valve 40 by way of serving as the inputs to the OR gate 152. Otherwise, in the absence of a failure of the other channel the LVDT transducer discrete signals from the other channel serve as the inputs to the OR gate 152 to control the shutoff valve 40.

In the event one or more of the LVDT transducer discrete signals input to the OR gate 152 goes high (i.e., logic "1"), indicating depression of a corresponding brake pedal, the output of the OR gate 152 will go high. The output of the OR gate 152 is input to an OR gate 162. The output of the OR gate 162 will therefore go high when the output of the OR gate 152 goes high. As a result, a shutoff valve enable signal is output by the OR gate 162 and is provided to the shutoff valve driver 140 via a logic enable gate 164 and line 166. If the output of the OR gate 152 is not high so as to indicate the absence of a valid brake command via the LVDT transducer discrete signals, the output of the OR gate 162 will remain low and the shutoff valve 40 will remain closed unless opened by a valid autobrake condition or gear retract condition. A system reset signal is provided to the logic enable gate 164 on line 163. In the event of a system reset, the logic enable gate 164 is disabled in order to prevent inadvertent opening of the shutoff value 40.

Autobrake settings (e.g., autobrake lo, med and max; autobrake rto enable 1 and 2; and rejected landing) are provided to the shutoff logic array device 110 from the autobrake interface 18 and discrete control signals 20. Autobrake lo, med and max selections are each input to an OR gate 170. The output of the OR gate 170 is input to an AND gate 172. Also input to the AND gate 172 is the inverted "rejected landing" signal. Provided one of autobrake lo, med and max selections is active to indicate an autobrake condition, and provided a rejected landing is not requested by the pilot as represented by the "rejected landing" signal, the output of the AND gate 172 will be a logic "1". The logic "1" is passed through an OR gate 174 to the OR gate 162. As a result, a valid autobrake condition exists which results in a shutoff valve enable signal being produced on line 166. Thus, the shutoff valve 40 can be opened via commands from the processor 104 to permit braking.

Alternatively, the RTO (rejected takeoff) logic within the system (not shown) provides dual autobrake rto enables 1 and 2 to the BSCU 12. Both of these enables must indicate an RTO condition with the Autobrake switch (autobrake rto) in the active position in order for the BSCU 12 to apply RTO braking. In the exemplary system, the autobrake rto enable 1 is active low, and the autobrake enable 2 is active high. Autobrake rto enable 1 is inverted and input to an AND gate 176, and autobrake enable 2 is input directly into AND gate 176. Provided both enables are active, the output of the AND gate 176 is active high. Moreover, provided the autobrake switch is active, the output of AND gate 180 goes high. Again, in such instance, a valid autobrake condition (specifically an autobrake RTO condition) exists and causes the output of the AND gate 180 to go high. The output of the AND gate 180 is input to the OR gate 174 and is passed through to the OR gate 162 in order to enable the shutoff valve driver 140 and permit braking.

In the case of landing gear retract braking, "gear downlock" and "gear handle" discrete signals are provided to the shutoff logic array device 110. As with pedal command braking and autobraking, the shutoff logic array device 110 must be in agreement with the software control loop in order to permit braking during gear retract. Specifically, if the landing gear is locked down as indicated by "gear downlock" being a logic "1," an inverter 190 inverts the signal to a logic "0" which is input to an AND gate 192. The output of the AND gate 192 will therefore be "0" and is input to the OR gate 162. Since gear retract braking is undesirable when the gear is locked in the down position, gear retract braking will not occur.

In the event the gear is no longer locked down as indicated by the gear downlock signal going low and the inverted signal becoming a logic "1," the input to the AND gate 192 goes high. Provided the gear handle which is also input to the AND gate 192 is a logic "1," indicating the pilot has pulled the gear retract brake handle, the output of the AND gate 192 goes high. As a result, the output of the OR gate 162 goes high and the shutoff valve driver 140 is enabled to permit braking.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A redundant architecture for a brake-by-wire system, comprising:
    a pressure source;
    at least one brake actuator for exerting a braking force on a wheel as a result of pressure provided by the pressure source;
    at least one servo valve for controlling an amount of pressure provided from the pressure source to the at least one brake actuator In response to a servo valve command signal;
    a shutoff valve in line with the at least one servo valve for preventing pressure from the pressure source from being provided to the at least one brake actuator in response to a shutoff valve command signal;
    a processor which executes code in order to carry out brake control operations, the processor outputting the servo valve command signal and the shutoff valve command signal in response to system inputs provided to the processor;
    a shutoff valve enable device for performing brake control operations redundant at least in part with the processor and based on the system inputs, and selectively enabling shutoff valve command signals from the processor to be provided to the shutoff valve based on the redundant brake control operations.

2. The system of claim 1, wherein the processor provides a brake control loop which is primarily software based, and the shutoff valve enable device provides a redundant brake control loop which is primarily hardware based.

3. The system of claim 2, wherein the shutoff valve enable device is configured primarily of digital logic.

4. The system of claim 1, wherein the shutoff valve enable device is operative in response to system inputs representing brake pedal commands.

5. The system of claim 4, wherein the brake pedal commands are represented by a plurality of channels of redundant brake pedal commands, and the shutoff valve enable device selects between channels.

6. The system of claim 5, wherein the shutoff valve enable device selects between the channels based on system information indicating the health of a particular channel.

7. The system of claim 4, wherein the brake pedal commands are analog signals and the shutoff valve enable device converts the analog signals to discrete signals.

8. The system of claim 7, wherein the shutoff valve enable device is configured primarily within a digital logic array, and the discrete signals serve as inputs within the digital logic array.

9. The system of claim 1, wherein the shutoff valve enable device is operative in response to system inputs representing autobrake commands on an aircraft.

10. The system of claim 1, wherein the shutoff valve enable device is operative in response to system inputs representing gear retract braking commands on an aircraft.

11. The system of claim 1, wherein the wheel is a wheel of an aircraft.

12. The system of claim 1, wherein the pressure source is a hydraulic source.

* * * * *